(12) United States Patent
Diard

(10) Patent No.: US 8,040,351 B1
(45) Date of Patent: Oct. 18, 2011

(54) USING A GEOMETRY SHADER TO PERFORM A HOUGH TRANSFORM

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1013 days.

(21) Appl. No.: 11/934,725

(22) Filed: Nov. 2, 2007

Related U.S. Application Data

(60) Provisional application No. 60/953,169, filed on Jul. 31, 2007.

(51) Int. Cl.
*G06T 15/50* (2011.01)
(52) U.S. Cl. ......... 345/426; 382/167; 382/170; 382/173
(58) Field of Classification Search .......... 382/149, 382/173, 103, 167; 702/185; 375/240, 240.1; 345/520
See application file for complete search history.

(56) References Cited

U.S. PATENT DOCUMENTS

| | | | |
|---|---|---|---|
| 6,292,586 B1 * | 9/2001 | Kawakami et al. | 382/236 |
| 6,400,848 B1 * | 6/2002 | Gallagher | 382/254 |
| 7,373,277 B1 * | 5/2008 | Wu et al. | 702/185 |
| 2002/0085000 A1 | 7/2002 | Sullivan et al. | |
| 2003/0118222 A1 * | 6/2003 | Foran et al. | 382/128 |
| 2005/0122334 A1 * | 6/2005 | Boyd et al. | 345/520 |
| 2005/0163382 A1 * | 7/2005 | Herley | 382/199 |
| 2005/0190951 A1 * | 9/2005 | Shyu | 382/103 |
| 2005/0281460 A1 * | 12/2005 | Wilt | 382/168 |
| 2006/0104510 A1 * | 5/2006 | Aharon et al. | 382/173 |
| 2006/0239536 A1 * | 10/2006 | Shibuya et al. | 382/149 |
| 2007/0053586 A1 * | 3/2007 | Makino | 382/167 |
| 2007/0172148 A1 * | 7/2007 | Hawley | 382/281 |
| 2007/0297501 A1 * | 12/2007 | Hussain et al. | 375/240 |
| 2008/0056349 A1 * | 3/2008 | Lyashevsky et al. | 375/240.1 |

OTHER PUBLICATIONS

Persson, Emil, "ATI Radeon HD 2000 Programming Guide", AMD Developer Center, ATI Radeon SDK Samples & Documents, http://developer.amd.com/gpu/radeon/pages/RadeonSDKSamplesDocuments.aspx, Jun. 2007.*
Richard O. Duda and Peter E. Hart. 1972. Use of the Hough transformation to detect lines and curves in pictures. Commun. ACM 15, 1 (Jan. 1972), 11-15. DOI=10.1145/361237.361242 http://doi.acm.org/10.1145/361237.361242.*
Nyland, L.; McAllister, D.; Popescu, V.; McCue, C.; Lastra, A.; Rademacher, P.; Oliveira, M.; Bishop, G.; Meenakshisundaram, G.; Cutts, M.; Fuchs, H.; , "The impact of dense range data on computer graphics," Multi-View Modeling and Analysis of Visual Scenes, 1999. (MVIEW '99) Proceedings. IEEE Workshop on , vol., no., pp. 3-10, 1999 doi: 10.1109/MVI.*
Josef Bigun, Pattern Recognition in Images by Symmetries and Coordinate Transformations, Computer Vision and Image Understanding, vol. 68, Issue 3, Dec. 1997, pp. 290-307, ISSN 1077-3142, DOI: 10.1006/cviu.1997.0556. (http://www.sciencedirect.com/science/article/pii/S1077314297905567).*
Office Action, U.S. Appl. No. 11/934,716 dated Feb. 16, 2011.

\* cited by examiner

*Primary Examiner* — Xiao Wu
*Assistant Examiner* — Phi Hoang
(74) *Attorney, Agent, or Firm* — Patterson & Sheridan, LLP

(57) ABSTRACT

A system and method uses the capabilities of a geometry shader unit within the multi-threaded graphics processor to execute a geometry shader program and perform a Hough transform.

17 Claims, 11 Drawing Sheets

USING A GEOMETRY SHADER TO PERFORM A HOUGH TRANSFORM

CROSS-REFERENCE TO RELATED APPLICATIONS

This application claims benefit of U.S. provisional patent application Ser. No. 60/953,169, filed Jul. 31, 2007, which is herein incorporated by reference.

FIELD OF THE INVENTION

Embodiments of the present invention relate generally to using a multi-threaded graphics processor configured as a geometry shader to perform a Hough transform.

DESCRIPTION OF THE RELATED ART

Conventionally, graphics processors are used for computer graphics. New capabilities allow multi-threaded graphics processors to be used for other domains that benefit from the massively parallel architecture. Recently, multi-threaded graphics processors include support for a geometry shader unit as specified by Microsoft's DirectX 10. Unlike the vertex shader and fragment shader of conventional graphics processors, the geometry shader unit is able to add or delete some elements in the geometry stream. Therefore, the geometry shader unit may be used to implement algorithms with variable input and output, such as general purpose algorithms that are outside of the conventional domain of processing geometry.

Accordingly, what is needed in the art is a system and method for using the capabilities of the geometry shader unit to implement algorithms with variable input and output.

SUMMARY OF THE INVENTION

A system and method for using the capabilities of a geometry shader unit within the multi-threaded graphics processor implements algorithms with variable input and output. The geometry shader unit may be configured to output variable-length output data based on adaptive, data-dependent execution of input data. A single vertex may be sent to the geometry shader unit and processed by a single computational thread to emit a variable length output including an adaptive number of scalar values. Image processing algorithms to build histograms, compress data, perform Hough transforms, and perform corner detection, may be executed with increased processing throughput using the geometry shader unit.

Various embodiments of a method of the invention for using a geometry shader program to perform a Hough transform include receiving input data for a Hough map that includes coordinate pairs in Hough space representing lines of an input image in image space, processing the input data using the geometry shader program to identify local maxima of the input data, and storing the local maxima in an output buffer.

Various embodiments of the invention for performing a Hough transform include a parallel processing unit. The parallel processing unit includes a memory configured to store a Hough map and an output buffer and multiple processing cores configured to execute a geometry shader program. When executed, the geometry shader program causes the multiple processing cores to read input data for the Hough map that includes coordinate pairs in Hough space, the input data representing lines of an image in image space, process the input data using the multiple processing cores to identify local maxima of the input data, and store the local maxima in an output buffer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
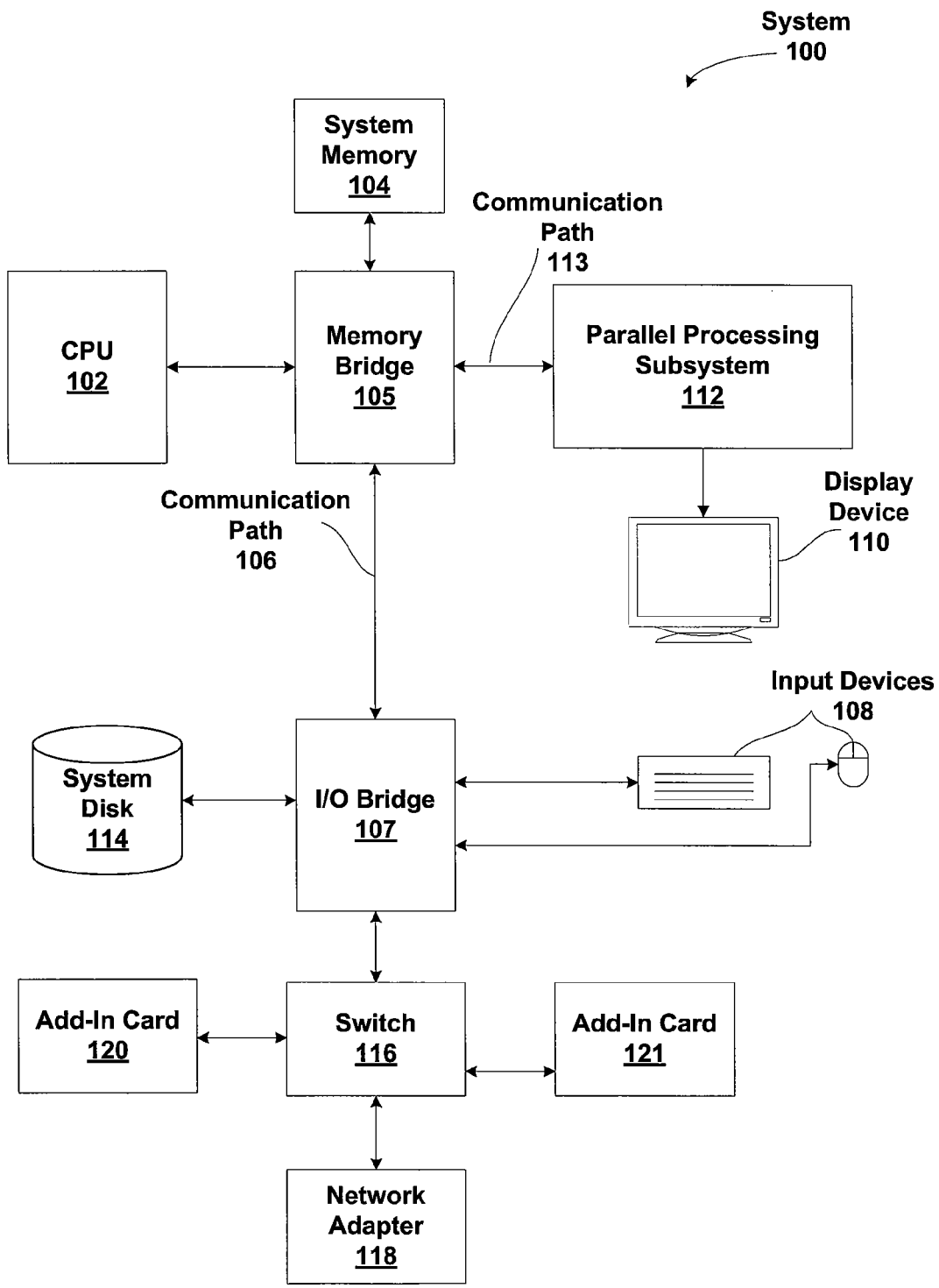
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
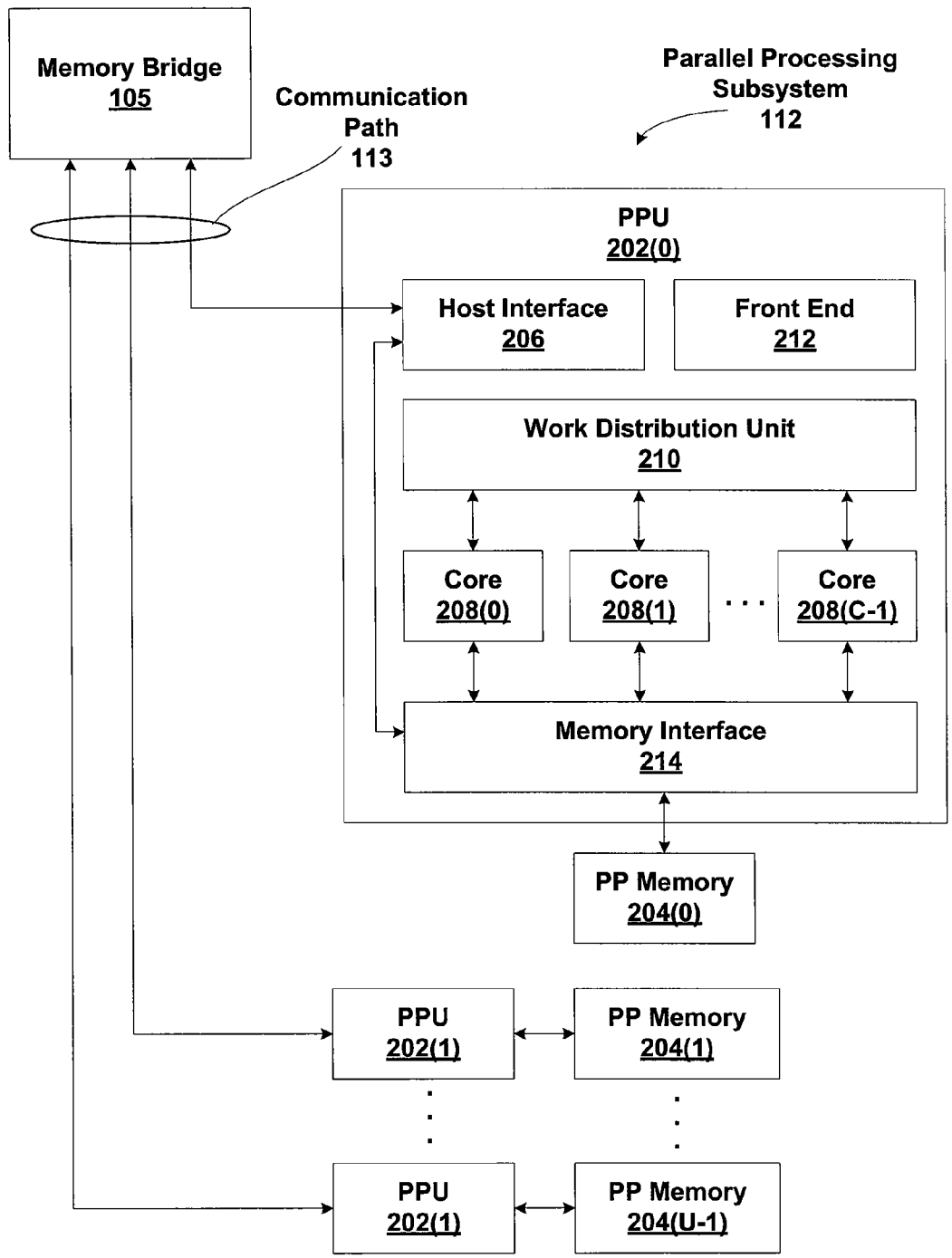
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores 208 to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have its own dedicated PP memory device(s) 204 or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
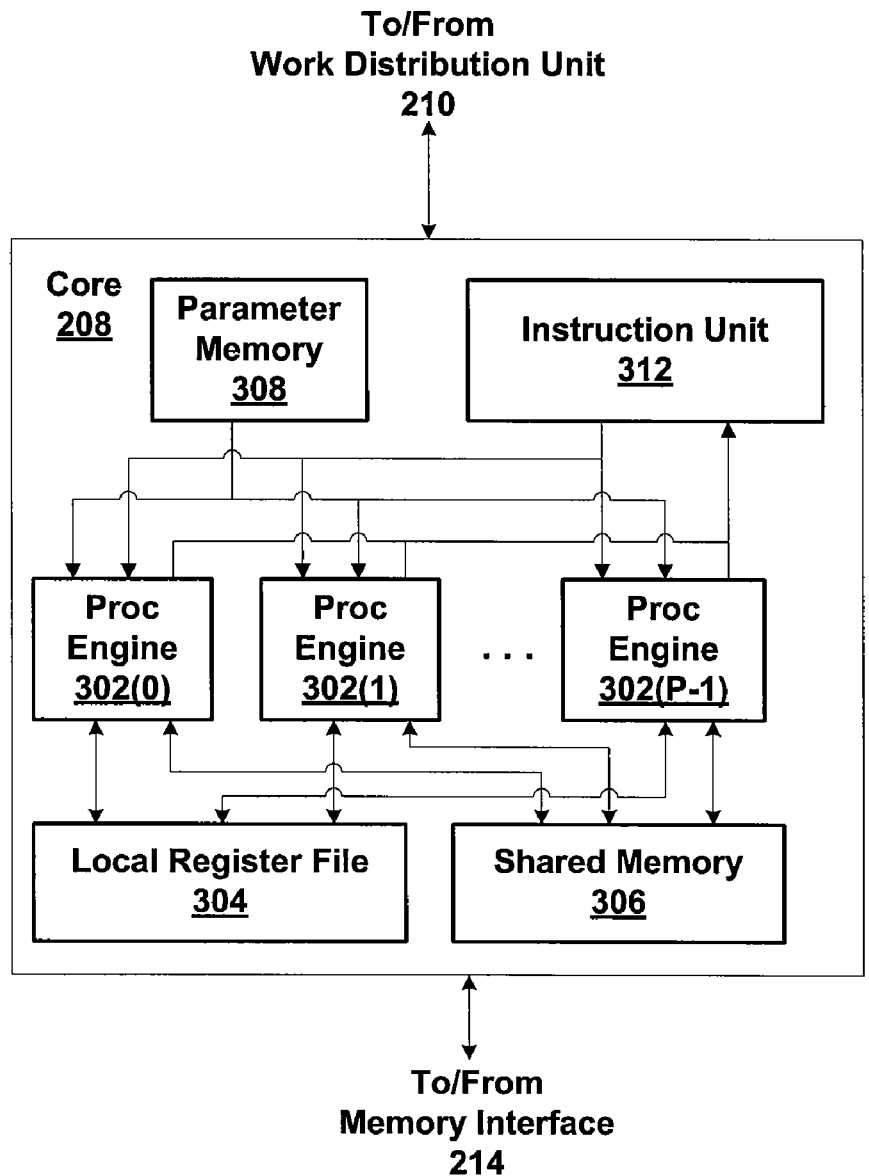
FIG. 3 is a block diagram of a core for the parallel processing subsystem of FIG. 2 in accordance with one or more aspects of the present invention.

FIG. 3 is a block diagram of a core 208 for the parallel processing subsystem 112 of FIG. 2, in accordance with one or more aspects of the present invention. PPU 202 includes a core 208 (or multiple cores 205) configured to execute a large number of threads in parallel, where the term "thread" refers to an instance of a context, i.e., a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory, which can include, e.g., PP memory 204 and/or system memory 104, with system memory 104 being accessible via host interface 206. It is to be understood that any memory external to PPU 202 may be used as global memory.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency. Since each thread may correspond to a different context, multiple contexts may be processed over multiple cycles as different threads are issued for each cycle.

Instruction unit 312 is configured such that, for any given processing cycle, an instruction (INSTR) is issued to each P processing engines 302. Each processing engine 302 may receive a different instruction for any given processing cycle when multiple contexts are being processed simultaneously. When all P processing engines 302 process a single context, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads for a single context or N*24 concurrent threads for each context, where N is the number of processing engines 302 allocated to the context.

Operation of core 208 is advantageously controlled via a work distribution unit 200. In some embodiments, work distribution unit 200 receives pointers to data to be processed (e.g., primitive data, vertex data, and/or pixel data) as well as locations of pushbuffers containing data or instructions defining how the data is to be processed (e.g., what program is to be executed). Work distribution unit 200 can load data to be processed into shared memory 306 and parameters into parameter memory 308. Work distribution unit 200 also initializes each new context in instruction unit 312, then signals instruction unit 312 to begin executing the context. Instruction unit 312 reads instruction pushbuffers and executes the instructions to produce processed data. When execution of a context is completed, core 208 advantageously notifies work distribution unit 200. Work distribution unit 200 can then initiate other processes, e.g., to retrieve output data from shared memory 306 and/or to prepare core 208 for execution of additional contexts.

It will be appreciated that the core architecture described herein is illustrative and that variations and modifications are possible. Any number of processing engines may be included. In some embodiments, each processing engine 302 has its own local register file, and the allocation of local register file entries per thread can be fixed or configurable as desired. In particular, entries of local register file 304 may be allocated for processing each context. Further, while only one core 208 is shown, a PPU 202 may include any number of cores 205, which are advantageously of identical design to each other so that execution behavior does not depend on which core 208 receives a particular processing task. Each core 208 advantageously operates independently of other cores 205 and has its own processing engines, shared memory, and so on.

Graphics Pipeline Architecture

Figure 4:
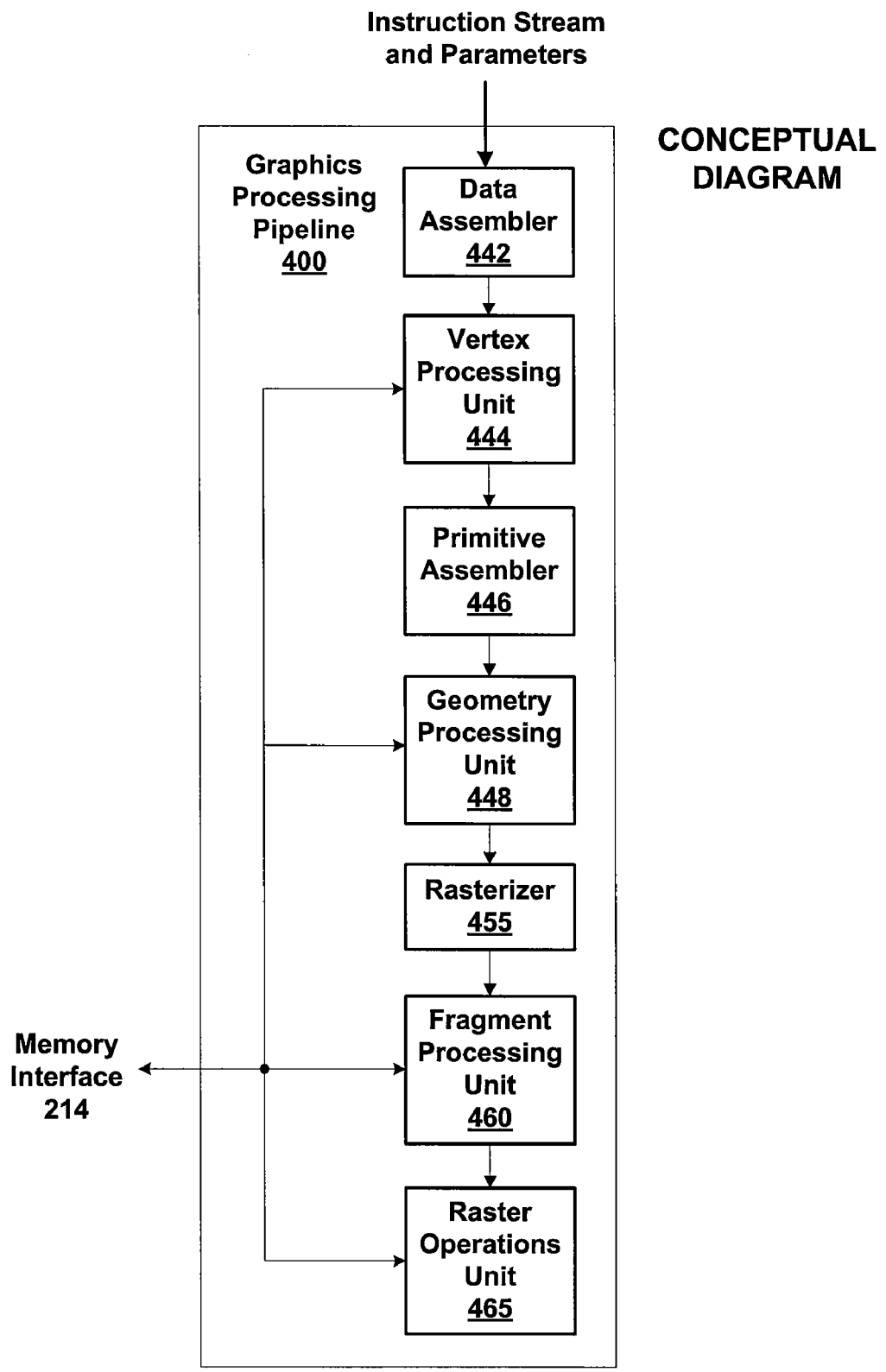
FIG. 4 is a conceptual diagram of a graphics processing pipeline in accordance with one or more aspects of the present invention.

FIG. 4 is a conceptual diagram of a graphics processing pipeline 400, in accordance with one or more aspects of the present invention. PPU 202 may be configured to form a graphics processing pipeline 400. For example, core 208 may be configured to perform the functions of a vertex processing unit 444, geometry processing unit 448, and a fragment processing unit 460. The functions of data assembler 442, primitive assembler 446, rasterizer 455, and raster operations unit 465 may also be performed by core 208 or may be performed by host interface 206.

Data assembler 442 is a fixed function unit that collects vertex data for high-order surfaces, primitives, and the like, and outputs the vertex data to vertex processing unit 444. Vertex processing unit 444 is a programmable execution unit that is configured to execute vertex shader programs, transforming vertex data as specified by the vertex shader programs. For example, vertex processing unit 444 may be programmed to transform the vertex data from an object-based coordinate representation (object space) to an alternatively based coordinate system such as world space or normalized device coordinates (NDC) space. Vertex processing unit 444 may read data that is stored in PP memory 204 or system memory 104 for use in processing the vertex data.

Primitive assembler 446 receives processed vertex data from vertex processing unit 444 and constructs graphics primitives, e.g., points, lines, triangles, or the like, for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. Geometry processing unit 448 may also add or delete elements in the geometry stream in order to execute algorithms for which the number of outputs is dynamic. In contrast with vertex processing unit 444 and fragment processing unit 460, geometry processing unit 448 is able to output variable-length results based on adaptive, data-dependent execution, as described in conjunction with FIGS. 5A, 5B, 6A, 6B, and 7C. Geometry processing unit 448 outputs the parameters and new graphics primitives to rasterizer 455. Geometry processing unit 448 may read data that is stored in PP memory 204 or system memory 104 for use in processing the geometry data.

Rasterizer 455 scan converts the new graphics primitives and outputs fragments and coverage data to fragment processing unit 260. Fragment processing unit 460 is a programmable execution unit that is configured to execute fragment shader programs, transforming fragments received from rasterizer 455 as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in PP memory 204 or system memory 104 for use in processing the fragment data. Memory interface 214 produces read requests for data stored in graphics memory, decompresses any compressed data, and performs texture filtering operations, e.g., bilinear, trilinear, anisotropic, and the like. Raster operations unit 465 is a fixed function unit that optionally performs near and far plane clipping and raster operations, such as stencil, z test, and the like, and outputs pixel data as processed graphics data for storage in graphics memory. The processed graphics data may be stored in graphics memory, e.g., PP memory 204, and/or system memory 104, for display on display device 110 or for further processing by CPU 102 or parallel processing subsystem 112.

Using the Geometry Shader for Image Processing

As previously described, a geometry shader program executed by core 205 configured as a geometry processing unit 448 can be used to accomplish some tasks that vertex shader programs and pixel (fragment) shader programs are unable to perform efficiently. This capability allows a new class of commodity algorithms to be performed by core 205. For example, in the computer vision domain, this new programming technique can be used to avoid having CPU 102 read back images produced by PPU 202 for additional processing. By sending a few scalars back to system memory 104 instead of entire images, system processing throughput and scalability is improved. Additionally, a geometry shder program may be used to produce variable-length output. For example, a texture input can be scanned and a number, 2n+1 of real numbers written to the frame buffer, where n is computed dynamically while reading the contents of the input texture. The algorithm output is a set of 2D locations—pairs of x and y scalar—in addition to the number of pairs as a scalar.

A pixel shader is unable to produce adaptive variable-length output for two reasons. Firstly, a pixel shader repeats the same algorithm for all for the pixels of the output buffer, and n is not known in advance. Secondly, core 208 configured as a fragment processing unit 460 that is working on a pixel from the output buffer has no visibility to the context of other threads that are processing other pixels (adjacent or not), so no global/adaptive decision can be taken.

Similarly, a vertex shader is also not very helpful for producing adaptive variable-length output. For example, a compression program that is working on an input stream of data can be implemented by sending one geometry primitive (such as a flat triangle), and the vertex shader can loop over the input data and compress. However, the program will have to provide exactly one triangle to rasterizer 455 to write different bytes (the compressed codes) to the output buffer. This is not possible, because the vertex shader will write the same code to all of the pixels that are rasterized as part of the triangle. So, although a vertex shader can run a program that collects statistics on the input data by fetching texels, the vertex shader is only able to perform two actions, killing the primitive or forwarding the primitive to the other processing units in graphics processing pipeline 400 to write the same code on all of the pixels associated with the primitive. To be able to write n different codes to the output buffer, the vertex shader would have to receive n elements of geometry. But then n vertex shader program would run, all doing the same thing and unable to make any adaptive decisions because they run in separate threads, isolated from each other.

In contrast, a geometry shader executed by a core 205 that is configured as a geometry processing unit 448 is able to output variable-length results based on adaptive, data-dependent execution. In a single pass, the geometry shader can analyze input data (for example, the contents of a texture) and output a variable-length code (many scalars can be emitted by a single geometry shader execution thread). in this manner, the core 205 is able to implement small algorithms for which either the output size is not known in advance or the output size is known, but the size spans several pixels.

It is possible to output variable-length results by executing a geometry shader by providing a single vertex to the geometry shader. If some input data can be passed in as static program parameters, e.g. as color for a Cg program, this vertex is processed in a single execution thread. The single thread can build statistics, fetch as many texels as needed, perform math operations, plus write a variable-length output by emitting an adaptive number of scalars.

Figure 5A:
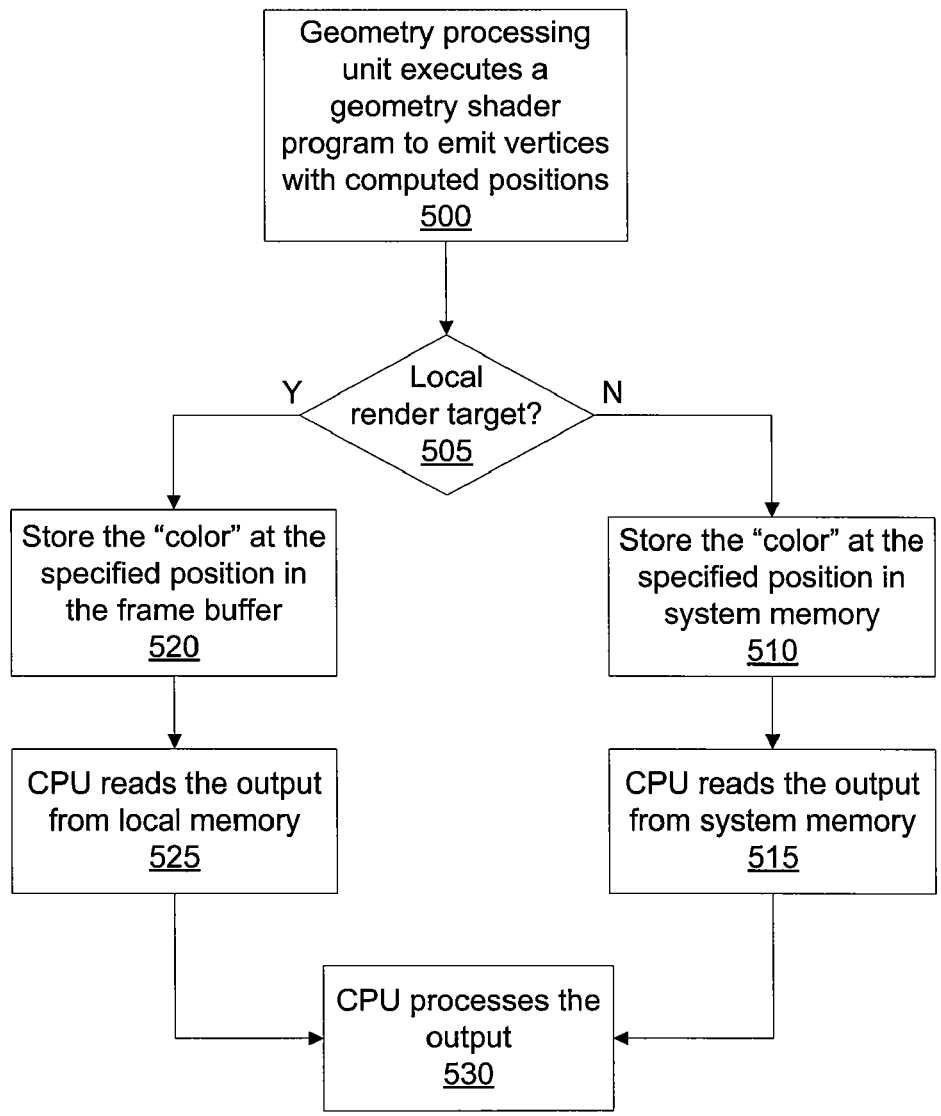
FIG. 5A is a flow diagram of method steps for executing a geometry shader program to produce an output buffer in accordance with one or more aspects of the present invention.
Figure 5B:
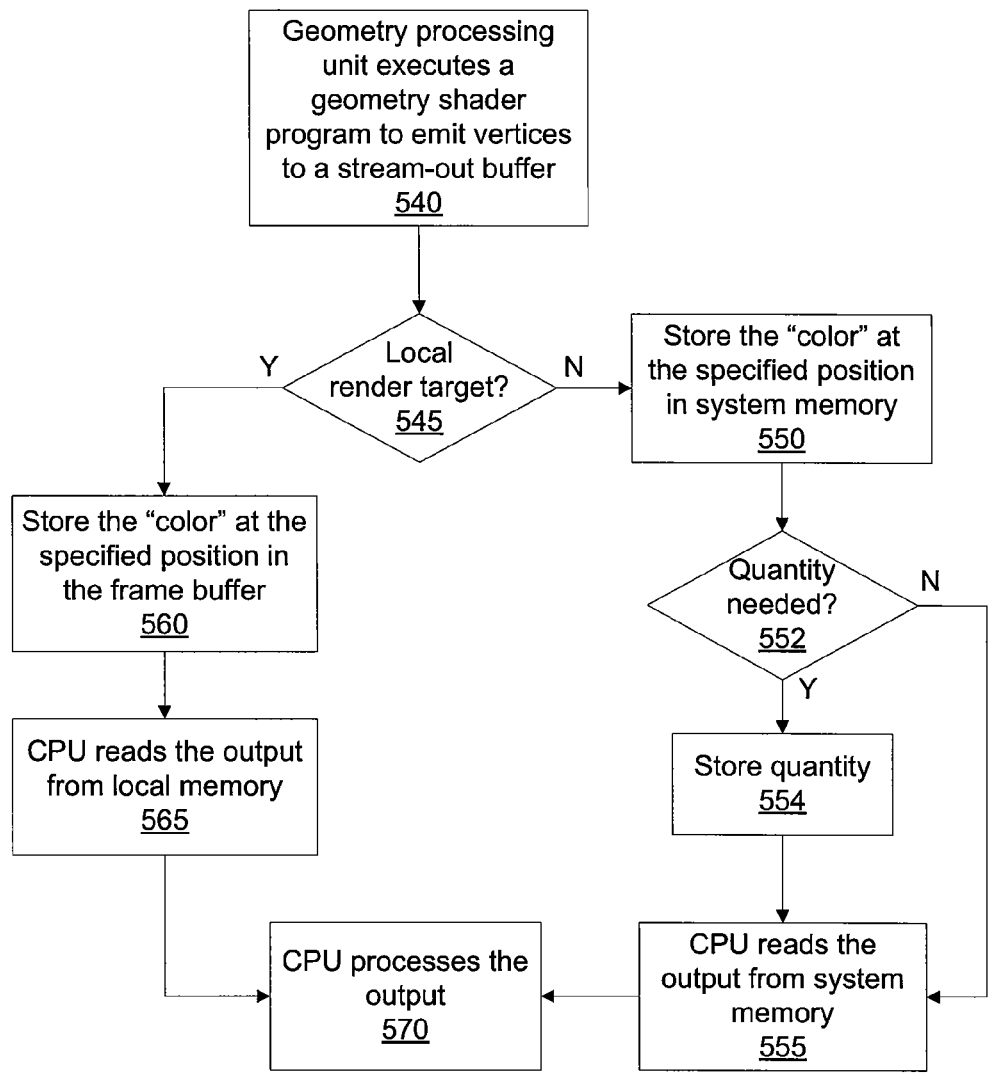
FIG. 5B is a flow diagram of method steps for executing a geometry shader program to produce a stream-out buffer in accordance with one or more aspects of the present invention.

Geometry processing unit 448 can write results produced during execution of a geometry shader in two ways, as described in conjunction with FIGS. 5A and 5B. Geometry processing unit 448 can emit vertices for which raster operations unit 465 will write the scalar values at any location in the render target, e.g., PP memory 204 or system memory 104. Alternatively, geometry processing unit 448 can emit scalars that are incrementally added to a stream-out buffer, a DX10 feature that redirects the output of the geometry processing unit 448 into a one dimensional buffer into graphics memory.

FIG. 5A is a flow diagram of method steps for executing a geometry shader program using a core 205 configured as a geometry processing unit 448 to produce an output buffer, in accordance with one or more aspects of the present invention. In step 500 geometry processing unit 448 executes a geometry shader program to emit vertices with computed positions. The "position" and "color" (a packet of scalars) of these emitted vertices are computed by the geometry shader program and given to rasterizer 455. The x and y coordinates of the vertices tell raster operations unit 465 where to write the scalars that are stored in the frame buffer's color packet. For this to work, the codes emitted by the geometry shader should be unmodified by the transform and clipping unit, so the model/view transforms are set to "identity," with no filtering, pixel fragment processing unit 460 usage, or lighting effects allowed.

In step 505 raster operations unit 465 determines if the render target is local, i.e., PPU memory 204, and, if so, then in step 520 raster operations unit 465 stores the "color" at the specified position in the frame buffer in PPU memory 204. The geometry shader emits and transmits vertices to rasterizer 455, setting the two dimensional coordinates, x and y. The x coordinate is incremented each time the geometry shader emits values to be written to the output buffer.

In step 525 CPU 102 reads the output from the frame buffer in PPU memory 204. In step 530 CPU 102 processes the output produced by the geometry shader. Offloading the computations performed by the geometry shader program from CPU 102 improves the overall system throughput. CPU 102 is able to read a small amount of data, compared with the input image data reducing the bandwidth needed between CPU 102 and PPU memory 204 or system memory 104.

If, in step 505 raster operations unit 465 determines that the render target is not local, i.e., system memory 104, then in step 510 raster operations unit 465 stores the "color" at the specified position in system memory 104. In step 515 CPU 102 reads the output from system memory 104 and in step 530 CPU 102 processes the output produced by the geometry shader.

A geometry shader program is able to write data to an output buffer at any location, one or two dimensional, and at any rate (the number of scalar outputs per input vertex) by passing data packets to rasterizer 455. FIG. 5B is a flow diagram of method steps for executing a geometry shader program using a core 205 configured as a geometry processing unit 448 to produce a stream-out buffer, in accordance with one or more aspects of the present invention. In step 540 geometry processing unit 448 executes a geometry shader program to emit vertices to a stream-out buffer. In step 545 raster operations unit 465 determines if the render target is local, i.e., PPU memory 204, and, if so, then in step 560 raster operations unit 465 stores the "color" at the specified position in the frame buffer in PPU memory 204. In step 565 CPU 102 reads the output from the frame buffer in PPU memory 204. In step 570 CPU 102 processes the output produced by the geometry shader.

If, in step 545 raster operations unit 465 determines that the render target is not local, i.e., system memory 104, then in step 550 raster operations unit 465 stores the "color" at the specified position in system memory 104. In step 552 geometry processing unit 448 determines if the quantity of data is needed, and, if so, in step 554 raster operations unit 465 writes the quantity to a predetermined location in the stream-out buffer. If CPU 102 needs to retrieve the number of codes that were output during execution of a geometry shader program, CPU 102 can read the quantity from a known position in the output data, such as the first scalar written at the end of the geometry shader thread when the exact number of emitted codes is known. Alternatively, CPU 102 can retrieve the quantity through an occlusion query.

If, in step 552 geometry processing unit 448 determines that the quantity of data is not needed, then the method proceeds directly to step 555. In step 555 CPU 102 reads the output from system memory 104 and in step 570 CPU 102 processes the output produced by the geometry shader.

When the output of the geometry shader is sent to a frame buffer in PPU memory 204, the few bytes of output can be read back using the glReadPixels( ) function. When the output is sent to system memory 104, raster operations unit 465 will write only a few bytes to system memory 104, where CPU 102 can retrieve the bytes directly. This approach provides improved bus optimization compared to moving the whole input data to system memory 104 for CPU 102 to analyze.

The stream-out feature of DX-compliant hardware can also be used for output. In this case, the geometry shader program does not have to track the two dimensional location of the pixels being output. The stream-out feature is compact because it does not use the "location" components to write a linear buffer. However, each execution thread should have a different stream-out buffer since the threads execute in parallel. When a stream-out buffer is stored at some two dimensional position in the frame buffer, it can be readily used as an input texture to the next processing state, which is useful when we're implementing on-the-fly texture compression.

Using the Geometry Shader for Variable-Length Output It is possible to send only one vertex to produce a geometry shader execution thread that can read the entire input image and output the pixel values in one pass. However, core 205 configured to perform the operations of the processing units in graphics processing pipeline 400 is inherently parallel, so we can increase performance if the geometry shader program is executed on several geometry shader threads, with each thread working on a partition of the input image. This technique is easily performed by sending several vertices to trigger more geometry shader threads, as described in conjunction with FIG. 6A.

Figure 6A:
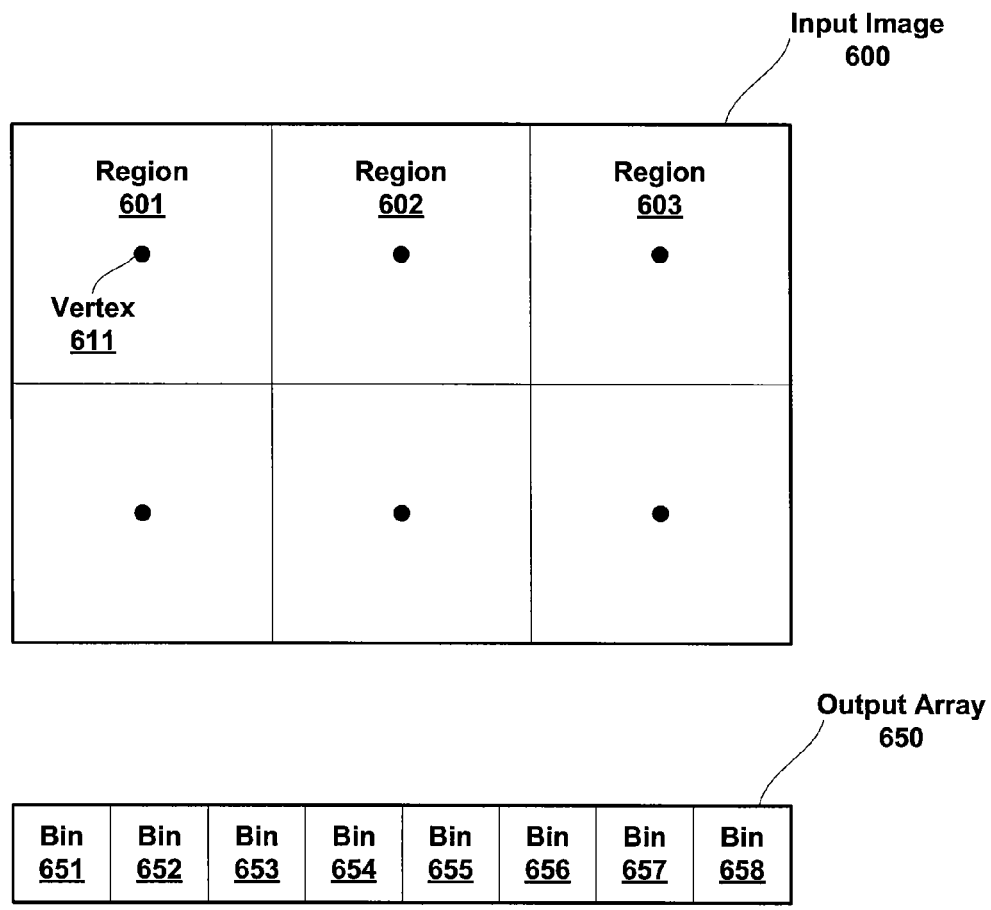
FIG. 6A is a conceptual diagram of multithreaded execution of a geometry shader program for image processing in accordance with one or more aspects of the present invention.

FIG. 6A is a conceptual diagram of multithreaded execution of a geometry shader program for image processing, in accordance with one or more aspects of the present invention. Input image 600 is divided into several regions, e.g., region 601, 602, and 603 for processing by several threads in parallel. The output is stored in output array 650 which includes several bins, e.g., bin 651, 652, 653, 654, 655, 656, 657, and 658. For any one of the regions that is processed by an execution thread of a geometry shader program, outputs may be produced for one or more of the bins in output array 650 to produce output data. For example, processing of region 601 may produce outputs for bin 651, 655, and 657.

The color of each vertex, such as vertex 511 in region 601, contains the coordinates and bounds of the input area, i.e., region 601. Each geometry shader thread can be programmed to output its processed data to n different locations, i.e., bins, in the frame buffer (256 scalars=64 RGBA32F pixels each). The outputs can then be read back on the CPU (n×256 floats) and summed. Because the output bins are simply added together, the n threads are programmed to output their results in the same frame-buffer location and enable the GL_BLEND function with GL_ONE/GL_ONE as arguments. This way, the floating-point values are summed up automatically and only one vector of 256 floats needs to be read back to CPU 102. For example, the thread processing region 602 may output results to bin 654 that are summed with results previously output by the thread processing region 603 and stored in bin 654.

Figure 6B:
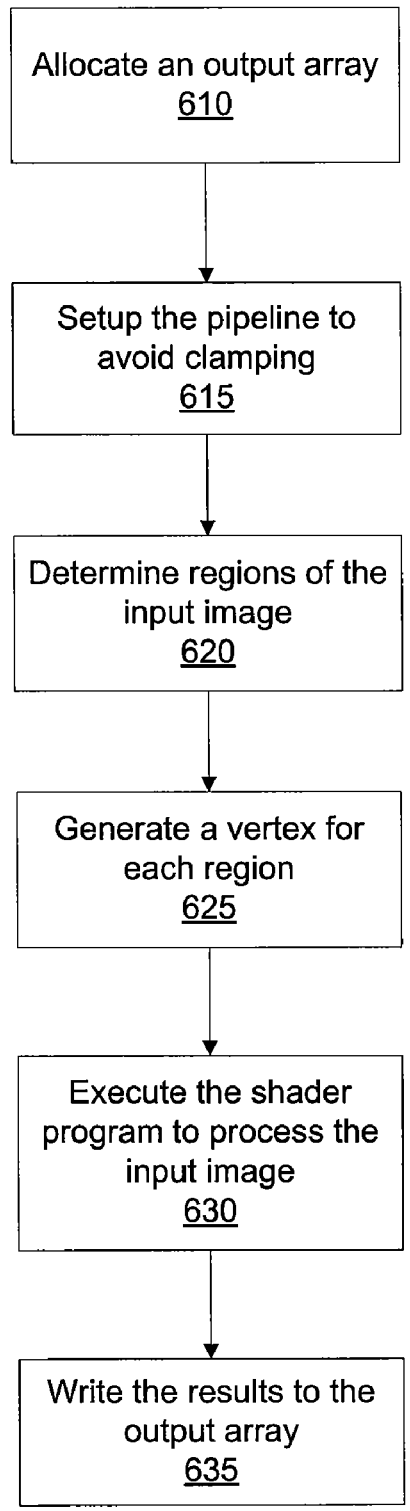
FIG. 6B is a flow diagram of method steps for executing a geometry shader program to perform image processing in accordance with one or more aspects of the present invention.

FIG. 6B is a flow diagram of method steps for executing a geometry shader program to perform image processing, in accordance with one or more aspects of the present invention. In step 610 an output array to store the output data is allocated in graphics memory. In step 615 one or more cores 208 are configured to avoid clamping operations. The trigger for the geometry shader program is a simple OpenGL program, which needs some special setup because what is passed in as colors are just full-range floating-point numbers in and out of shading programs, as shown in TABLE 1.

TABLE 1 glClampColorARB(GL_CLAMP_VERTEX_COLOR_ARB, FALSE);
glClampColorARB(GL_CLAMP_FRAMENT_COLOR_ARB, FALSE);
glClampColorARB(GL_CLAMP_READ_COLOR_ARB, FALSE);

In step 620 regions of the input image to be processed are determined. The regions may be of equal or different sizes and dimensions. In step 625 a vertex is generated for each one of the regions in order to process the regions in parallel using different execution threads. In step 630 the geometry shader program is executed by one or more cores 208 to process the input image. In step 635 each execution thread processing a region writes the results for that region to the output array. CPU 102 or PPU(s) 202 may then read the results from the output array and perform additional processing.

The geometry shader programming technique described for producing processed image data can also be used by DXT-like compression schemes, where the size of the output units (compressed blocks) is known in advance. DXT is a compression algorithm that takes a 4×4 pixel block as input. The two most representative colors are chosen and output as two 16-bit (565 format) color values. In addition, sixteen 2-bit indices are output to be used for lookup in a table that contains the two chosen colors and two interpolated colors. The input is 128 bytes and the output is 16 bytes, so the algorithm provides a 6:1 lossy compression (if alpha is discarded).

A geometry shader program can fetch 16 pixels and the write 16 bytes to the frame buffer. This program can use multiple GPU threads at the same time because blocks of input data are independent. A pixel shader is able to implement a regular DXT compressor because it has a fixed-size output of 8 bytes, and the compressed tile can be written with one pixel with color components of type GL_UNSIGNED-INT32. However, a pixel shader cannot be used for compression algorithms—such as for some DCT (discrete cosine transform) compression blocks that require writing more than 128 bits of output. Similarly, a pixel shader is not effective for handling algorithms that produce variable-length output, such as computer vision algorithms.

Three-dimensional graphics rendering takes a variable-length, compact, and parametric representation as an input (such as vertices, light positions, texture, and geometry) and outputs a fixed-size matrix of pixels. Conventional pixel shaders and vertex shaders are well adapted to processing data for three-dimensional graphics rendering. In contrast, computer vision algorithms take a static matrix of pixels as an input and output a variable-length, compact, and parametric representation of lines or estimates of the camera position, for example. These results are then fed back to some other device, such as CPU 102, for further action.

The inability of a conventional graphics processor to carry out processing states that require variable-length output has hampered the use of conventional graphics processors in the field of computer vision. Conventional graphics processors have been employed to implement portions of computer vision algorithms, using pixel shaders for regular, data-parallel processing to produce image buffers that are copied back to system memory for further processing by a CPU. The copying has the negative side effect of saturating the bus between the CPU and graphics processor, increasing the system memory footprint, increasing the CPU processing load, and stalling the graphics processor while the CPU performs processing that the graphics processor cannot accomplish. By configuring cores 208 to execute geometry shader programs, parallel processing subsystem 112 is advantageously employed to process algorithms with variable-length output, making parallel processing subsystem 112 a more viable compute target for computer vision compared with conventional graphics processors.

Figure 6C:
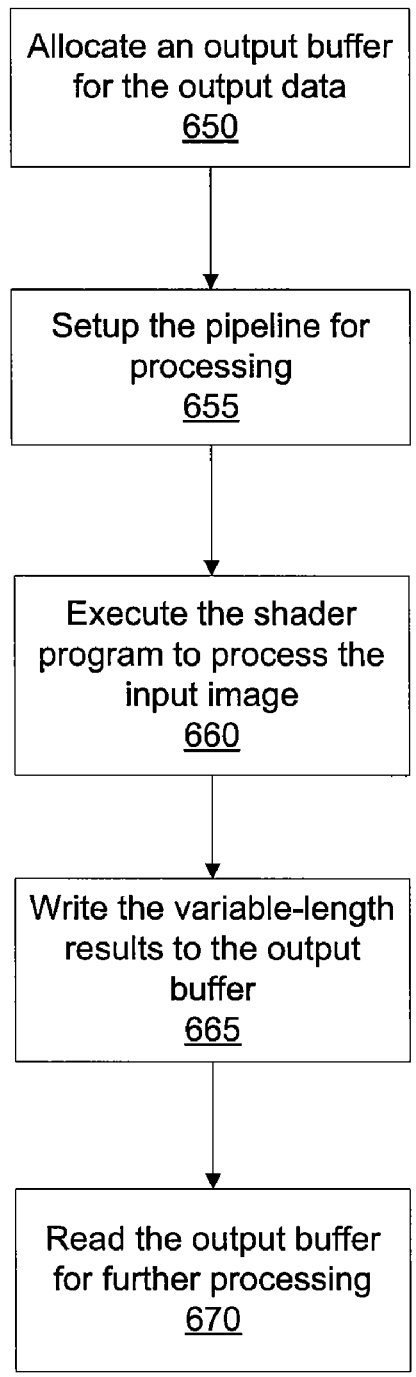
FIG. 6C is a flow diagram of method steps for executing a geometry shader program to produce variable-length output, in accordance with one or more aspects of the present invention.

FIG. 6C is a flow diagram of method steps for executing a geometry shader program to produce variable-length output, in accordance with one or more aspects of the present invention. In step 650 an output array is allocated in memory to store the variable-length output data. In step 655 one or more cores 208 are configured to avoid clamping operations, disable filtering, set the transform operations to identity, disable pixel shading, disable lighting effects, and the like. In step 660 the geometry shader program is executed by one or more cores 208 to process the input image and produce variable-length results. In step 665 the variable-length results are written to the output buffer. CPU 102 or PPU(s) 202 may then read the results from the output buffer and perform additional processing.

Using the Geometry Shader to Perform a Hough Transform

The method described in FIG. 6C may be used to perform a Hough transform, a classical computer vision algorithm for detecting straight lines in an image. The Hough transform is often used to help robots identify basic geometry for navigation or industrial quality control. In short, the algorithm builds a map of all lines that can exist in am image. Each line is represented with the pair (θ, d), where θ (theta) ranges from zero (inclusive) up to 2π and d (distance) is greater than or equal to zero. One pair, (x, y) in image space matches a continuous sinusoidal curve in Hough space, representing all the lines that go through this point. One pair (θ, d) in Hough space matches a line in the image space.

Figure 7A:
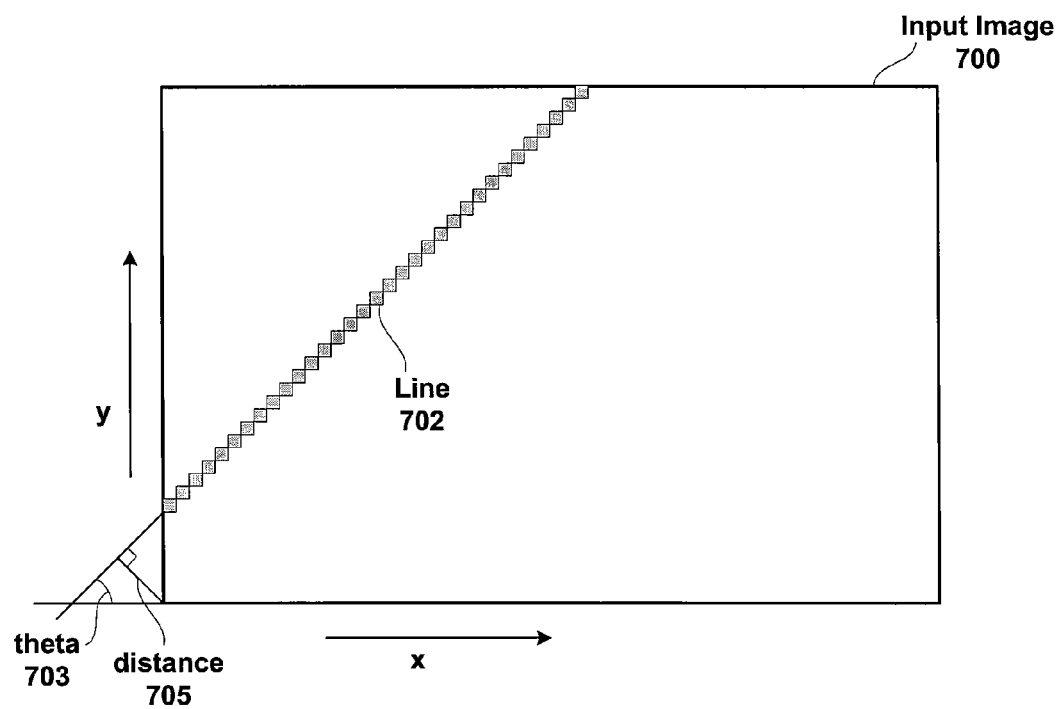
FIG. 7A is a rasterized line in image space in accordance with one or more aspects of the present invention.
Figure 7B:
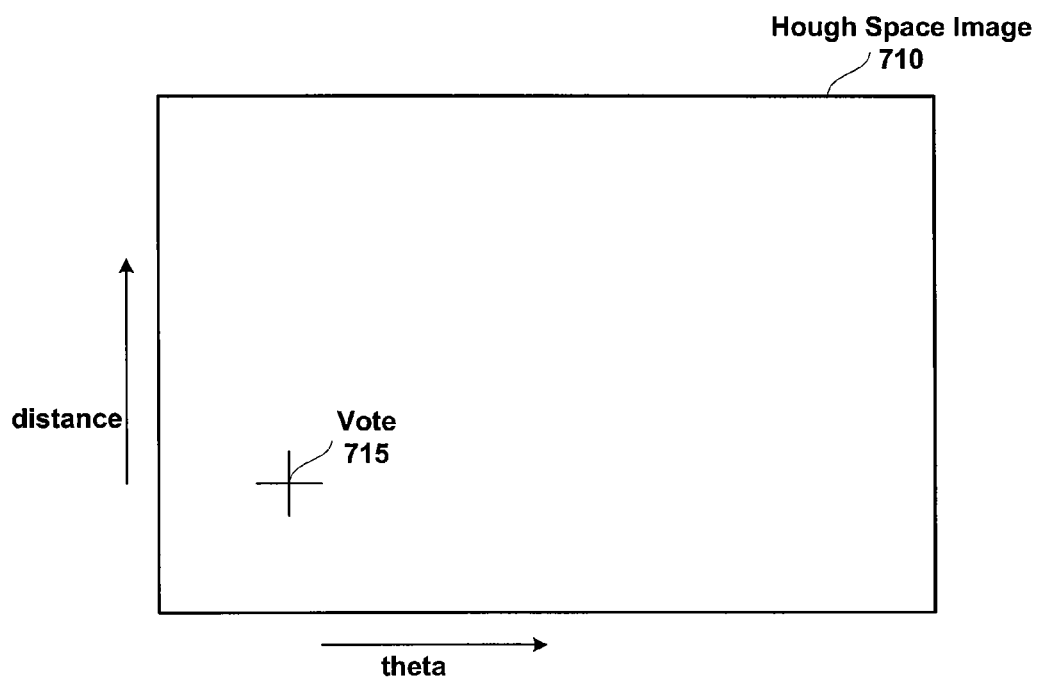
FIG. 7B is the (T, d) pair in the Hough space that corresponds to the rasterized line of FIG. 7A in accordance with one or more aspects of the present invention.

FIG. 7A is a rasterized line 702 of an input image 700 in image space, in accordance with one or more aspects of the present invention. Line 702 is defined by a theta 703 and distance 705 that represent a theta, distance pair in Hough space. FIG. 7B is the (θ, d) pair in the Hough space that corresponds to the rasterized line of FIG. 7A, in accordance with one or more aspects of the present invention. The (theta, distance) pair is shown as a vote 715 in Hough space image 710. Vote 715 is a maximum value that identifies the orientation and location of line 702. A geometry shader program may be used to search for local maxima in a Hough map, identify parametric lines in input image 700, and writing the dynamic output made of line coordinates. In conventional systems, a CPU is used to search for local maxima in the Hough map, requiring the CPU to read, process, and write the output data including the local maxima.

Figure 7C:
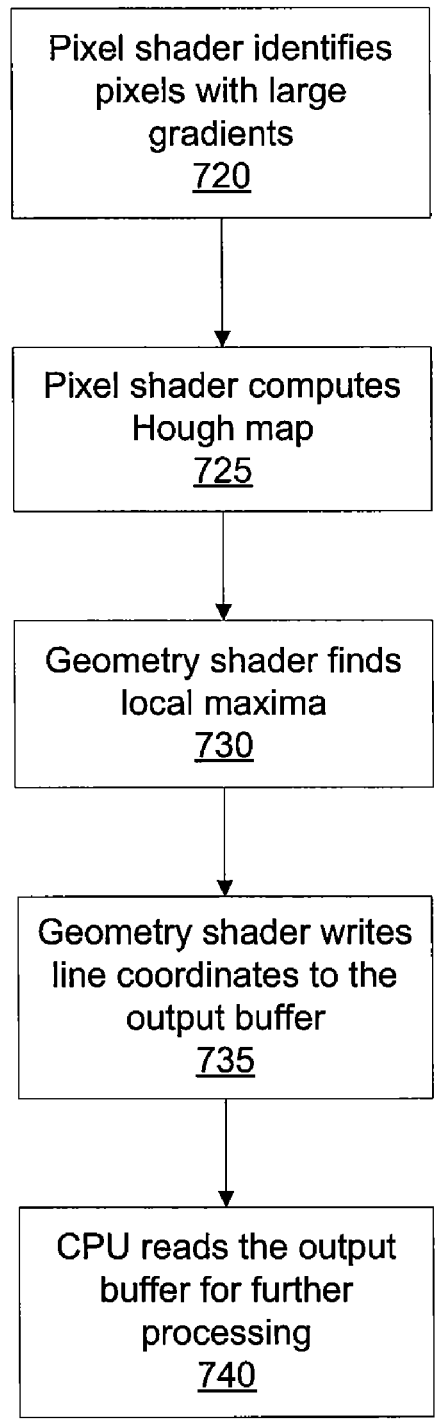
FIG. 7C is a flow diagram of method steps for executing a geometry shader program to produce a Hough map, in accordance with one or more aspects of the present invention.

FIG. 7C is a flow diagram of method steps for executing a geometry shader program to produce a Hough map, such as Hough space image 710, in accordance with one or more aspects of the present invention. In step 720 a pixel shader program is used to process input image 700, applying convolution kernels with thresholds to identify the pixels that have a large gradient. The pixel shader program is run by rendering a single graphics primitive (quad) that covers the entire input image 700.

In step 725 the pixel shader program computes the Hough map, finding all of the image pixels that belong to a line represented by a point (vote 715) and stores the Hough map in an output buffer. Specifically, the pixel shader program intersects each line with the graphics primitive and rasterizes the line, fetching the texels and summing the texels to write a single floating point number, vote 715, into the Hough map.

In step 730 a geometry shader program is executed to find n local maxima in the Hough map, identifying n parametric lines in input image 700. In step 735 the geometry shader program writes the dynamic output, made of line coordinates to the output buffer. Advantageously, the output buffer produced by the geometry shader program includes a few bytes of data that represent the lines, rather than the data specifying the lines. Therefore, the memory bandwidth requirements are reduced as well as the bandwidth needed between PPU 202 and CPU 102. Additionally, the local maxima computation is offloaded from CPU 102, freeing CPU 102 to perform other computations. In step 740, CPU 102 reads the output buffer for further processing.

A small geometry shader program is used to perform step 730. Specifically, one or more vertices trigger the computation of searching for local maxima in one or more regions, each corresponding to one of the vertices. The geometry shader program emits two scalars containing the line position for each local maximum that is found. The geometry shader program can also be configured to produce additional parameters for each line by fetching pixels from input image 700 that belong to each line and count the pixels that are lit, thus computing the start position and length of each segment in input image 700.

The code shown in TABLE 2 is a geometry shader program that may be used to dynamically output the location of local maxima.

TABLE 2

```
POINT void output MaxPositionsGS (
    AttribArray<float4> position : POSITION,
    AttribArray<float4> color : COLOR,
    uniform samplerRECR texIn,
    uniform float BlockSize)
{
    int index = 1;
    float sx = color[0].x sy=color[0].y; // Read block size from vertex color
    float4 outputPos : POSITION = position[0]; outputPos.y=0;
    for (int j=0; j<sy; j++)
        for (int i=0; i<sx; i++)
            if (texRECT(texIn, float2(i, j)).r==1.0)
            {
                outputPos.x = –1 + index/128;
                emitVertex(outputPos, float4(i, j, 0, 0) : COLOR);
                index++;
            }
    // outputting the number of points found
    outputPos.x = –1;
    emitVertex(outputPos, float2(index–1, 0, 0, 0) : COLOR);
}
```

The input to the geometry shader program shown in TABLE 2 has be preprocessed to increase efficiency. The pixel shader program, shown in TABLE 3 is run to find the local maximum of all of the pixels within a neighborhood of a current pixel. The pixel shader program outputs a value of 1 if the current pixel is the maximum, 0 otherwise.

TABLE 3

```
float4 findMaxFirstPassPS (float2 uv : TEX0,
    uniform samplerRECT texIn) : COLOR
```

TABLE 3-continued

```
{
  float lum, max;
  float2 t, tcenter;
  float4 valueOut = float4(0, 0, 0, 1);
  for (int j=KSIZE; j<KSIZE+1; j++) //KSIZE is the
  size of the input image
  {
    t[1]=uv[1]+j;
    for (int i=-KSIZE; i<KSIZE+1; i++)
    {
      t[0]=uv[0]+1;
      lum=texRECT(texln, t).r;
      if (lum>max)
      {
        max=lum;
        tcenter=t;
      }
    }
  }
  if (tcenter.x==uv.x && tcenter.y==uv.y)
    valueOut =float4(1, 0, 0, 0);
  return valueOut;
}
```

Conventional approaches that have been used to produce the theta, distance pairs in Hough space use a vertex shader program to plot the sinusoidal curve made of m vertices per pixel of interest. The source image needs to be stored in system memory and scanned by the CPU (m is the number of samples of theta) to send a large number of vertices to a graphics processor. In contrast, when a geometry shader program is used to produce the theta, distance pairs in Hough space, the CPU 102 is offloaded.

Another classical computer vision technique is corner detection for tracking points of interest. Corner detection algorithms can also be implemented efficiently using a core 205 configured to execute a geometry shader program. In general, an input image is processed by a set of convolution kernels, which are very well executed in parallel by cores 205 configured to execute pixel shader programs. many filters are used for feature extraction and multithreaded cores 205 are very efficient at handling these computationally intensive tasks. The final result of the algorithm is a generally dynamic set of two dimensional positions.

Conventional implementations of corner detection algorithms usually include a readback of temporary buffers of floating-point data that contain image gradients, eigenvalues, and so forth on the CPU to generate the list of two dimensional points representing the corners. The number of corners is not known in advance, but it is computed by analyzing local neighborhoods of coefficients. A geometry shader program is particularly well suited to accelerate the analysis of the coefficients because it offers dynamic and compact feedback to CPU 102. Again, the input image may be divided into regions in order to execute the geometry shader using multiple execution threads for parallel processing. Each thread writes its dynamic output to a different line (y coordinate corresponding to the emitted vertices) in the output buffer.

A primary advantage of moving data analysis from CPU 102 to PPU 202 is that the output buffers can be stored and read locally and that CPU 102 is offloaded. Additionally, if the results of a given algorithm, such as computer vision on live video, are only a few vectors, the performance can scale linearly with the number of PPUs 202 since CPU 102 processing is not increased significantly be adding PPUs 202.

Consider the case where the input data is the result of hard drive video decoding. Multiple PPUs 202 decode the incoming video stream in parallel into their respective PP memories 204. Once every g frames, each PPU 202 uses a pixel shader program to run an image filtering algorithm. Then each PPU 202 uses a geometry shader program to look for some features in the filtered data. This method is optimal since each PPU 202 will send back only a few bytes to system memory 104, which CPU 102 will process quickly because the data is fully available. If instead some processing stages are performed by CPU 102, the benefit of PPU 202 scalability is diminished since CPU 102 and communication path 113 can saturate and become a bottleneck. In the case of the video application, using a PPU 202 to run quick and simple geometry shader programs works particularly well since the video decoding can be performed in parallel and the data a video decoding engine and PPU 202 need to work on is shared in PPU memory 204 with no need to make additional copies.

It is advantageous to perform per-pixel computations as a pre-process using a pixel shader program to produce results that are stored in a temporary buffer. Whenever possible stages of an algorithm that are performed using a geometry shader program should be executed on a partitioned input image to exploit the massive parallelism of PPU 202.

By using a geometry shader program to produce further process the temporary buffer and produce variable-length output the copying of the temporary back to system memory for further processing by a CPU can be avoided. The copying has the negative side effect of saturating the bus between the CPU and graphics processor, increasing the system memory footprint, increasing the CPU processing load, and stalling the graphics processor while the CPU performs processing that the graphics processor cannot accomplish. By configuring cores 208 to execute geometry shader programs, parallel processing subsystem 112 is advantageously employed to process algorithms with variable-length output, making parallel processing subsystem 112 a more viable compute target for computer vision compared with conventional graphics processors.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A computer-implemented method for using a geometry shader program to perform a Hough transform, comprising:
   executing a pixel shader program by a multithreaded processor to compute input data defining a Hough map that includes coordinate pairs in Hough space representing lines of an input image in image space, wherein the pixel shader program is configured to compute the input data for the Hough map by rendering a graphics primitive that covers the entire input image and by intersecting the lines of the input image with the graphics primitive to generate the coordinate pairs;

executing the geometry shader program by the multi-threaded processor to identify local maxima of the input data; and storing the local maxima in an output buffer.

2. The method of claim 1, further comprising the step of determining regions of the input image, wherein each region of the input image is represented by a portion of the input data.

3. The method of claim 2, further comprising the step of generating a vertex for each one of the regions to produce a set of vertices.

4. The method of claim 3, wherein the step of processing the input data comprises executing the geometry shader program for each vertex in the set of vertices to produce portions of the local maxima.

5. The method of claim 4, wherein the geometry shader program is executed in parallel using a multithreaded processing core that is configured to allocate an execution thread to each vertex in the set of vertices.

6. The method of claim 4, wherein a y coordinate of each vertex in the set of vertices specifies a row in the output buffer.

7. The method of claim 1, wherein the geometry shader program is configured to disable clamping operations during the processing of the input data.

8. The method of claim 1, wherein the coordinate pairs include an angle and a distance.

9. A non-transitory computer readable medium including instructions that when executed by a multithreaded processor, cause the multithreaded processor to perform a Hough transform, by performing the steps of:

computing, according to a pixel shader program, input data defining a Hough map that includes coordinate pairs in Hough space representing lines within of image in image space, wherein the pixel shader program is configured to compute the input data for the Hough map by rendering a graphics primitive that covers the entire input image and by intersecting the lines of the input image with the graphics primitive to generate the coordinate pairs;

processing the input data according to a geometry shader program to identify local maxima of the input data; and storing the local maxima in an output buffer.

10. The computer readable medium of claim 9, further comprising the step of determining regions of the input image, wherein each region of the input image is represented by a portion of the input data.

11. The computer readable medium of claim 10, further comprising the step of generating a vertex for each one of the regions to produce a set of vertices.

12. The computer readable medium of claim 11, wherein the step of processing the input data comprises executing the geometry shader program for each vertex in the set of vertices to produce portions of the local maxima.

13. The computer readable medium of claim 12, wherein the geometry shader program is executed in parallel using a multithreaded processing core that is configured to allocate an execution thread to each vertex in the set of vertices.

14. The computer readable medium of claim 12, wherein a y coordinate of each vertex in the set of vertices specifies a row in the output buffer.

15. A parallel processing unit configured to perform a Hough transform, the parallel processing unit comprising:

a memory configured to store a Hough map and an output buffer;

multiple processing cores configured to execute a pixel shader program and geometry shader program, which when executed, causes the multiple processing cores to:

compute, according to a pixel shader program, input data defining the Hough map that includes coordinate pairs in Hough space, the input data representing lines of an image in image space, wherein the pixel shader program cause the multiple processing cores to compute the input data for the Hough map by rendering a graphics primitive that covers the entire input image and by intersecting the lines of the input image with the graphics primitive to generate the coordinate pairs;

process the input data according to a geometry shader program to identify local maxima of the input data; and store the local maxima in an output buffer.

16. The parallel processing unit of claim 15, wherein the geometry shader program further configures the parallel processing unit to divide the image into multiple regions and allocate a different execution thread to each one of the multiple regions in order to execute the geometry shader program in parallel.

17. The parallel processing unit of claim 16, wherein the geometry shader program further configures the parallel processing unit to generate a vertex for each one of the regions to produce a set of vertices.

* * * * *